March 15, 1938.　　　B. C. STICKNEY　　　2,111,410
TYPEWRITING MACHINE
Filed April 15, 1935　　　6 Sheets-Sheet 1
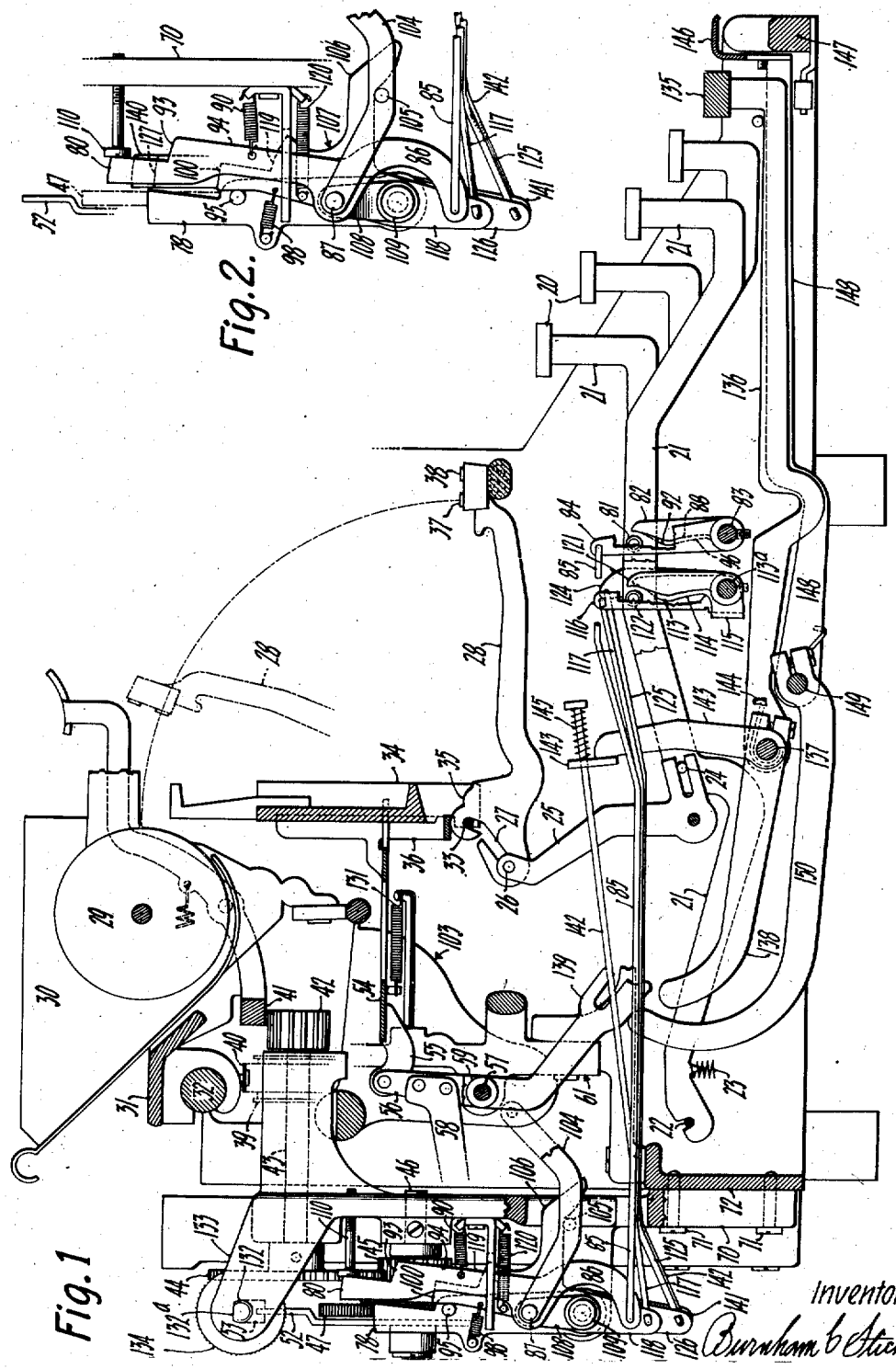
Inventor:
Burnham C Stickney

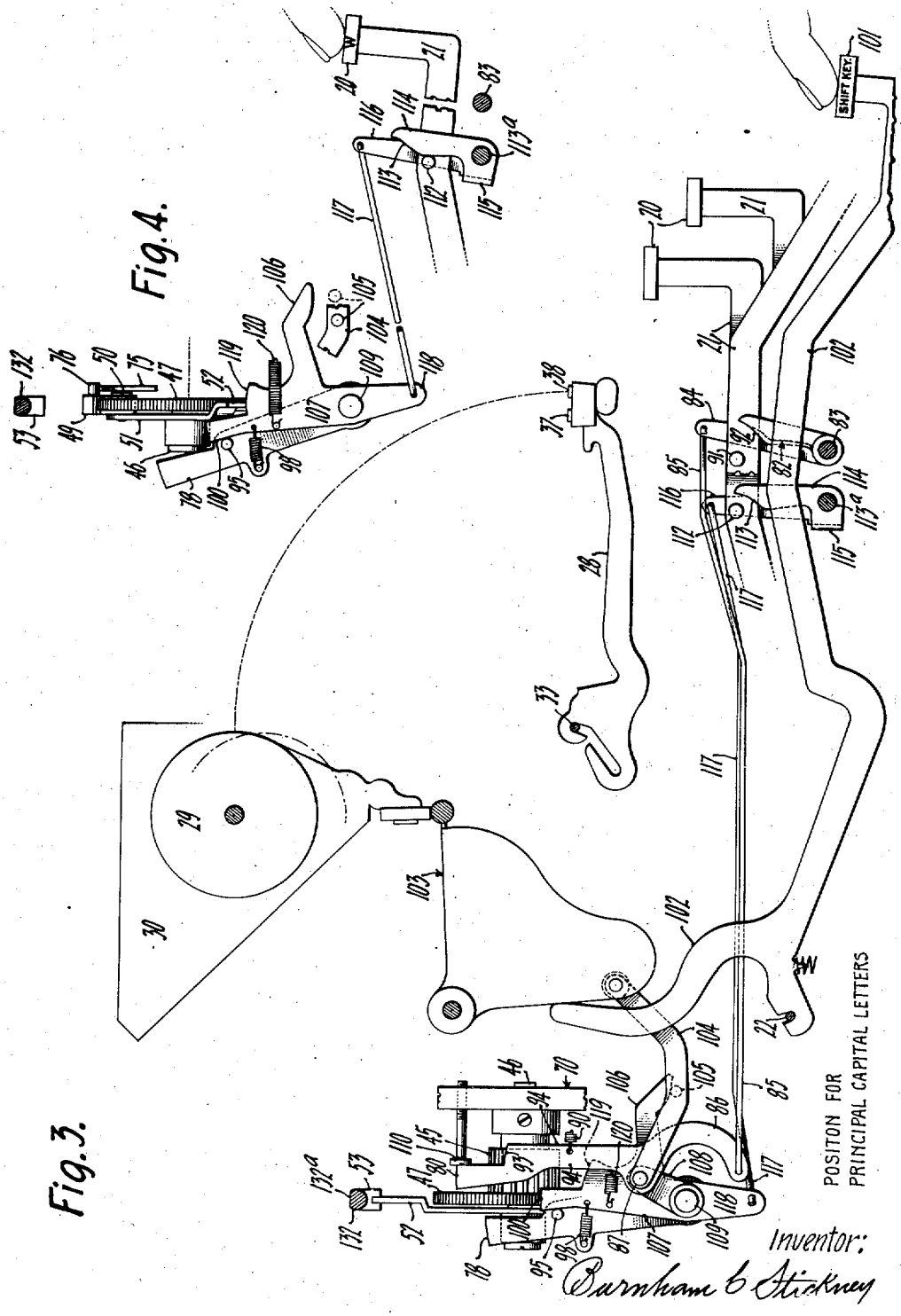

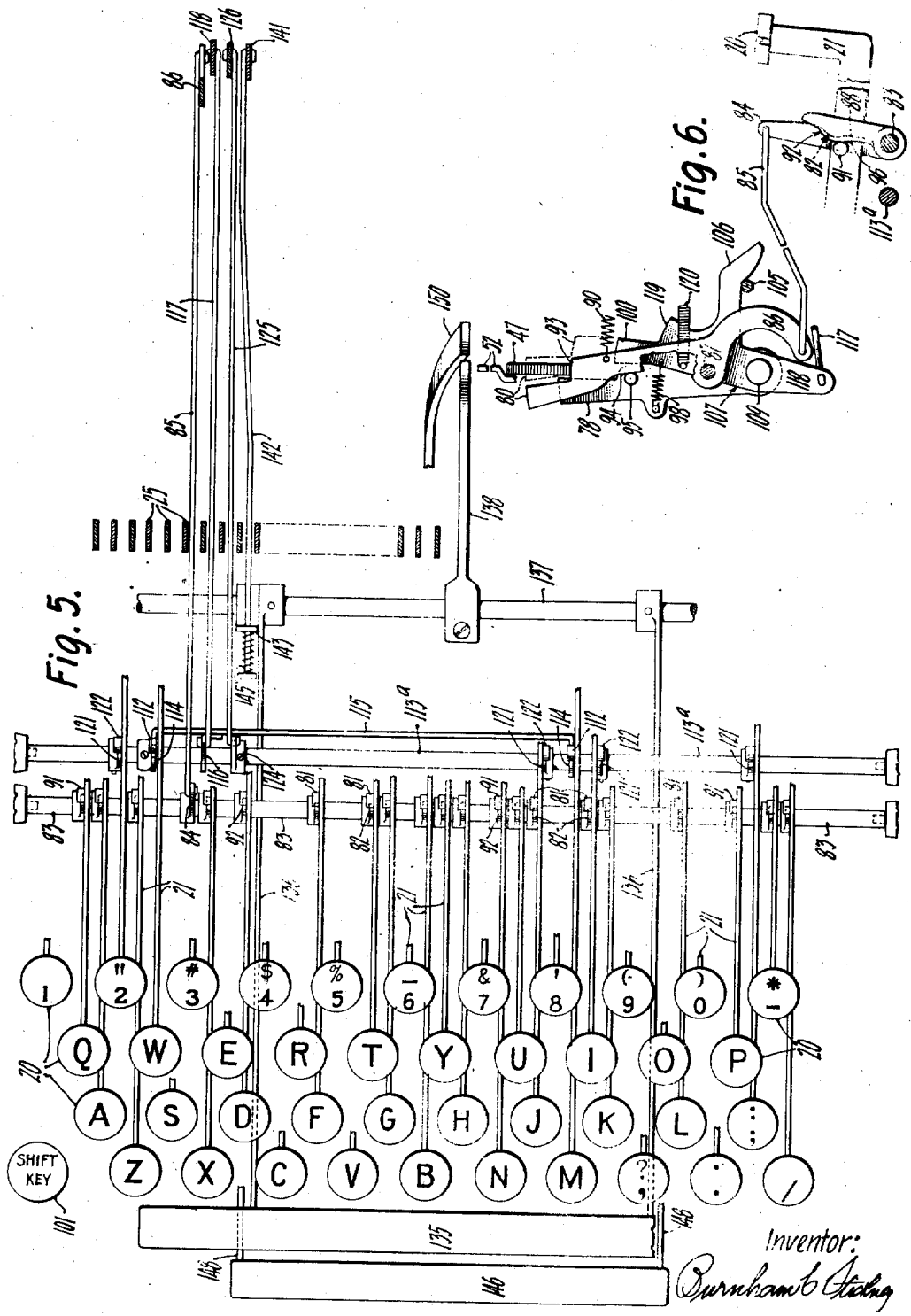

March 15, 1938.   B. C. STICKNEY   2,111,410
TYPEWRITING MACHINE
Filed April 15, 1935   6 Sheets-Sheet 4

Inventor:
Burnham C Stickney

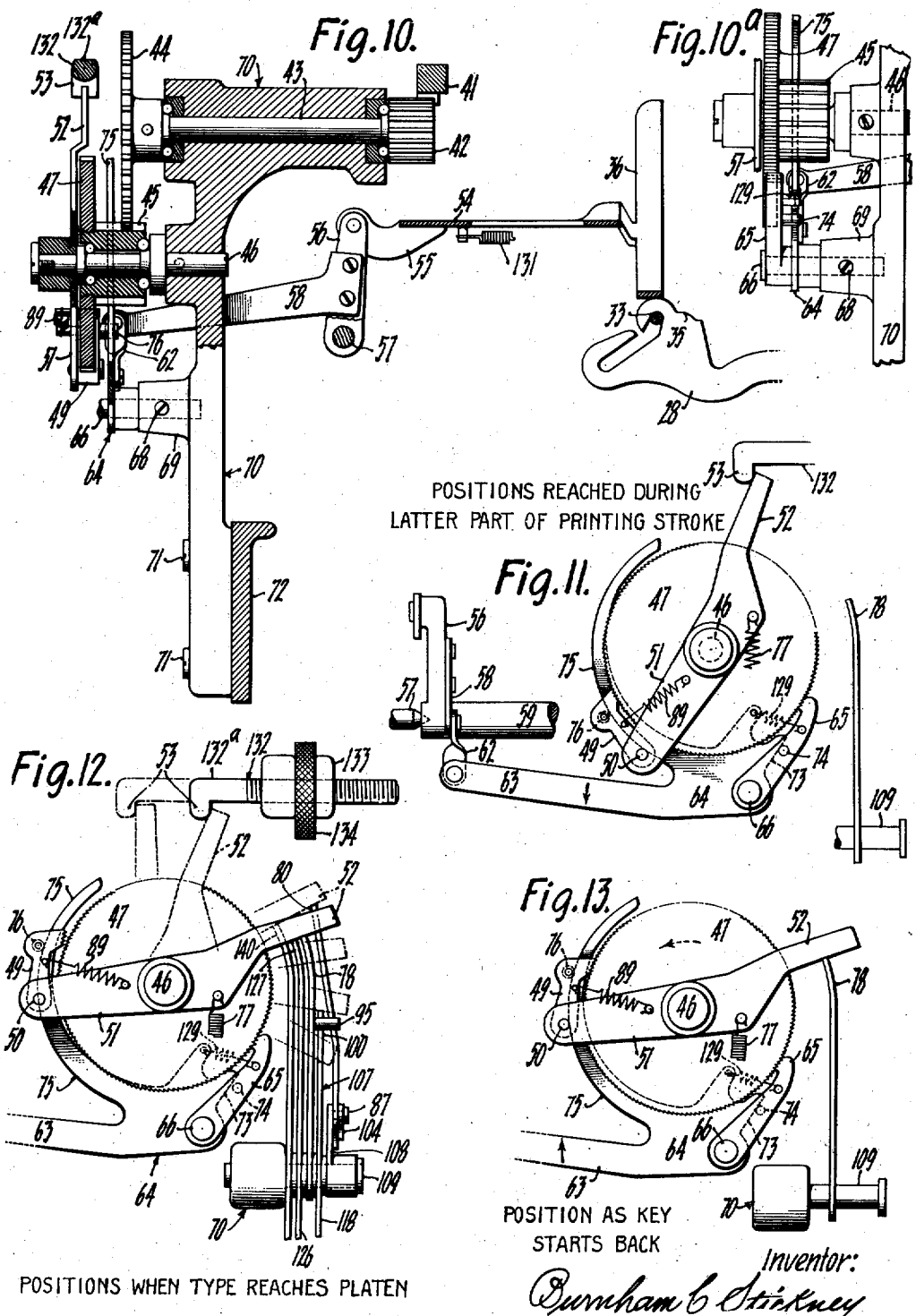

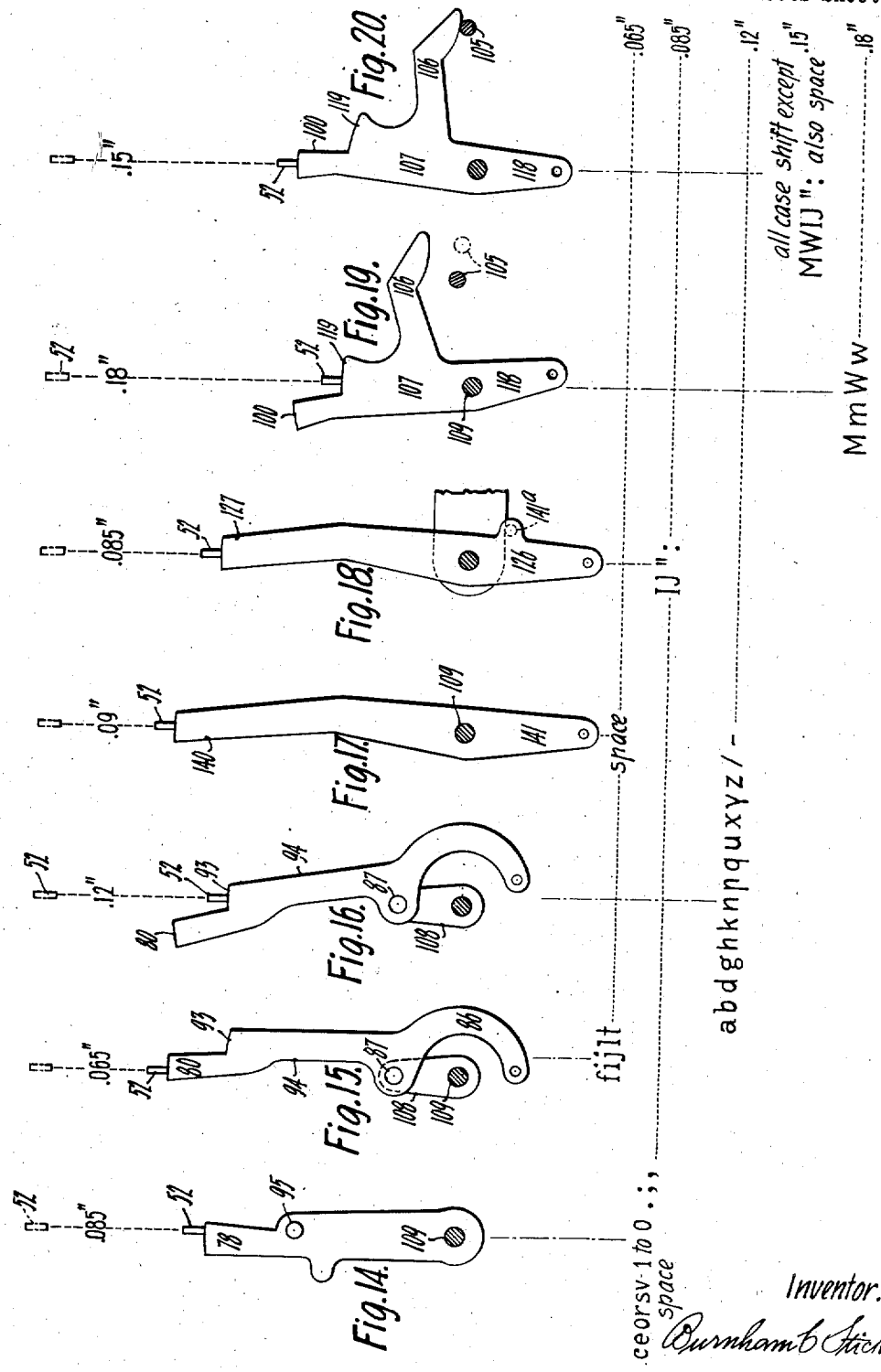

Patented Mar. 15, 1938

2,111,410

UNITED STATES PATENT OFFICE 2,111,410

TYPEWRITING MACHINE

Burnham C. Stickney, Hillside, N. J., assignor to Underwood Elliott Fisher Company, New York, N. Y., a corporation of Delaware Application April 15, 1935, Serial No. 16,390

27 Claims. (Cl. 197—84)

This invention relates to the class of typewriting machines which imitate press-printing, in which the types have various widths; the letter-feeding movement of the typewriter paper-carriage being varied automatically in accordance with the width of the typed letter.

One of the objects of the invention is to provide simple, reliable and efficient means for regulating the variable letter-feeding movements of the carriage.

A letter-feeding escapement-train includes a small pinion meshing with a rack on the power-driven carriage, a large gear fixed to said pinion and driving a second small pinion, and a large escapement-wheel fixed to the second pinion.

In the Underwood typewriter, in which this invention is shown embodied, the type-bars operate a standard universal bar. According to the present invention, this universal bar causes a novel spring-pressed detent-dog or pawl to mesh with the escapement-wheel, and at the same time withdraws a novel skipping or feeding dog, to permit vibration of a novel arm upon which the feeding dog is pivoted. Upon the return of the type-bar to normal position, the detent-dog is withdrawn from the wheel, and the feeding dog or pawl is restored by its spring into mesh with the wheel. The wheel is rotated by the power-driven carriage, and the feeding dog therefore regulates or predetermines the escapement-wheel movement, and hence determines the extent of letter-feeding travel of the carriage.

For co-operating variably with the escapement-wheel, said feeding dog is mounted upon a vibratory arm. This dog is normally in mesh with the wheel, and is released by said universal bar at the down stroke of the type-key. At the same time a detent-dog is moved into mesh with the wheel.

Said release of the feeding dog permits a spring to vibrate the arm, and the released dog rides idly over the escapement-teeth. The movement of the released arm is variable, thereby predetermining the length of the ensuing feed of the carriage.

The escapement-wheel is provided with teeth of very fine pitch, and, owing to the movement-multiplying nature of the escapement-train, it results that the travel of the carriage, corresponding with a single-tooth movement of the escapement-wheel, is imperceptible. The pitch of the escapement-wheel tooth may be one-thirtieth of an inch, and the corresponding travel of the carriage may be 1/270 of an inch. In no instance could either over-spacing or under-spacing exceed a single-tooth space upon the wheel, and hence its effect upon the spacing of the letters on the work-sheet would be negligible.

The feeding and detent dogs each have multiple teeth to increase efficiency and minimize wear.

The escapement-wheel mechanism gives the correct spacing for the narrowest and the widest letters, and those of intermediate sizes, but the widths of the types do not need to be multiples of one another, nor do they need to be designed upon a multiple system, nor is there need to determine the number of escapement-teeth that are traversed for any escapement-movement of the carriage. It will be manifest that a mis-spacing could not be in excess of a single-tooth space on the wheel, which, as already noted, would effect only an imperceptible travel of the carriage.

The spring-driven movement of the released feed-dog mount or arm is limited by a permanent stop.

Its return movement is in most instances determined by a regulating stop which is normally maintained in effective position.

This arrangement permits proper spacing of many frequent letters, such as e, o, c, r, s, etc., so that the keys for typing those letters are not burdened with adjusting any regulating trains, but merely operate the standard universal bar.

For spacing the thinnest letters, such as i, l, etc., the stroke of the feed-dog is shortened. For this purpose, a stop is interposed in its path. This stop is set by means of a regulating train that is operable by any of the thin-letter keys, but by no others. Upon releasing the key, the stop-regulating train is restored to normal position.

For such wider letters as n, u, etc., a key-operated train displaces the normal stop and substitutes another, which permits a longer swing of the feeding-dog arm.

When the capital shift-key is depressed, it also disables the described regulating train and brings into use a second regulating train, which is operable by nearly all the type-keys, and effects a greater but uniform movement of the paper-carriage for nearly all the capital letters. When the capital shift-key is operated in the typewriter, the normally effective feed-regulating stop is displaced by said shift-key, and there is substituted a capital-spacing stop, which affords a long swing of the feed-dog arm, and thereby permits an increased feeding movement of the paper-carriage.

For the capital types I and J, a special connection is made, whereby the feeding movement of the carriage is reduced.

For the type-keys M and W, a special stop is brought into use, giving a maximum letter-spacing movement of the carriage, whether typing a capital or lower-case letter.

The invention further presents a very desirable feature that would be found impracticable when composing printers' type. This is in the nature of automatic regulation of the closeness or separation of the typed letters from one another. By a simple adjustment of the aforesaid normally effective feed-stop, the extent of movement of the vibrating arm carrying the feed-dog may be increased a trifle, and hence there may be produced a corresponding increase in the spacing of the letters, which is a desideratum for many classes of work. The regulation or adjustment of said stop may make the same increase for all the types, so as to produce uniformly over-spaced typing. The degree of over-spacing may be very delicately graduated to the maximum desired point.

If desired, the stop may be so set that regular work will be slightly over-spaced, thus permitting either occasional apparent under-spacing or occasional apparent over-spacing.

Said group of stops may stand side by side, and without the use of delicate mechanism are readily and reliably thrown into effective positions.

This fine regulation of the letter-spacing is rendered practical by the use of a movement-multiplying escapement-train with the fine-pitch teeth on the escapement-wheel, since, as already pointed out, an error, if any, in the feeding movement of the escapement-wheel, could not exceed the pitch of one tooth, which would be negligible upon the typed page.

The intra-word spacing regulation also presents the advantage of being efficacious in bringing the ends of the lines out evenly, or effecting fairly good justification. For this purpose, the last two or three words in a line may be a trifle over-spaced, whereby the line may be sufficiently lengthened for the purpose. Or the regulating stop may be adjusted reversely, thereby crowding a trifle the letters which compose the last two or three words of the line, thereby shortening the line sufficiently. Skill for this purpose can be acquired by the operator, so that it would seldom be found necessary to retype a page before sending it to the photolithographic plant.

Other features and advantages will hereinafter appear.

In the accompanying drawings,

Figure 1 is a sectional central longitudinal elevation of an Underwood typewriting machine to which the present improvements are applied; the parts being shown in normal positions.

Figure 2 is a view on a larger scale of the variable stop-system for controlling the carriage-feed.

Figure 3 is a view similar to Figure 1, but showing only one type-bar, and showing the platen-frame shifted up, and a different positioning or setting of the carriage-spacing stops.

Figure 4 is a view corresponding to Figure 3, but showing the stop-mechanism set or positioned for affording a wide spacing movement of the carriage, used when typing the widest types.

Figure 5 is a sectional plan of the typewriter-keyboard and key-lever system, showing the group of space-regulating trains and the variably settable stops thereof.

Figure 6 shows the regulating-stop system seen at Figure 2, but shows the stops set for affording a medium-spacing movement of the carriage for letters such as $n$, $d$, $b$, etc.

Figures 7, 8, 9:
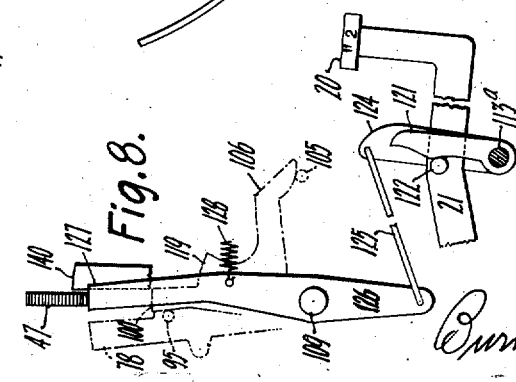
Figure 7 is a segment on an enlarged scale of the extremely minute pitch of the teeth of the carriage-escapement wheel. While the wheel is advancing the distance of a single tooth, the movement of the paper-carriage is negligible, being about a thousandth of an inch, more or less.
Figure 8 shows a figure-key depressed to print the upper-case character '', a stop having been brought into action accordingly.
Figure 9 is a rear elevation of said machine with the present improvements, showing the parts in normal positions.

Figure 10 is a sectional side elevation through the carriage-feeding train, showing that the movement of the escapement-wheel is multiplied as compared with prior practice. This view also shows the separate universal bar which is operated by the type-bars and takes part in controlling the escapement of the typewriter-carriage. This carriage-escaping universal bar is moved by the type-bars at every stroke. It releases the carriage from the control of the novel variable jump feeding dog. It also puts the carriage temporarily under the control of a detent-dog, whereby the spring-propelled carriage is restrained during the jump of the novel feeding dog.

Figure 10$^a$ is a side elevation of the escapement-train seen at Figure 10.

Figure 11 is a rear elevation showing the initial stage in carriage-feeding operation, the detent-dog having been set by the carriage-escaping universal bar to restrain the escapement-wheel.

Figure 12 is a rear elevation which shows the parts seen at Figure 11, and also the differential stop-system which controls the extent of jumping of the carriage-feeding dog 49. The latter is shown as having been driven around from normal position (Figure 11) until an arm 52 thereon is arrested by the selected stop. Arm 52 and dog 49 are shown in full lines. The differential stop-system is shown in the form of blades standing side by side.

Figure 13 is also a rear elevation, and shows the next stage of the carriage-feeding operation. The dog 49 at Figure 13 is shown as having been put in mesh with the escapement-wheel. The parts are now ready for the detent-dog to release the escapement-wheel. Such release is effected by the return movement of the universal bar 36 to the normal position at Figure 10.

Figures 14 to 20 show the various regulator-throw stops in effective positions.

Alphabetical and numeral type-keys 20 depress levers 21, whose rear ends are held up against a transverse fulcrum-rod 22 by springs 23. By means of pins 24, said levers vibrate bell-cranks 25, the latter having pins 26 working in slots 27 to swing type-bars 28 upwardly and rearwardly against a platen 29. The platen is mounted in a frame 30 that is shiftable up and down upon a paper-carriage 31, which slides upon rails 32. The type-bars 28 swing upon a fulcrum-rod 33, working in radial slots in a segment 34, and are provided with shoulder-portions 35 to operate a segmental universal bar 36. The foregoing mechanism is usual in an Underwood machine.

Types 37, 38 may be thrown up and back to print through a vibrating ink-ribbon (not shown) against a work-sheet carried upon the platen 29. The types are of various widths, their proportions corresponding substantially with printers' types. They may be inked in various ways, as, for example, by an ink-roll mechanism, such as used in the Sun typewriter (Burridge Patent No. 697,605, of April 15, 1902), and may print directly upon the work-sheet, conducing to clearness and attractiveness, although the impressions may be otherwise inked.

The carriage may be driven by spring-barrel 39 and strap 40. It has an escapement-rack 41, which may be lifted out of normal mesh with an escapement-pinion 42, which is at the driving end of the novel carriage-escapement mechanism.

Said pinion 42 communicates by means of a shaft 43 with a gear 44 of large diameter fixed on said shaft, the latter meshing with a novel pinion 45 of small diameter, the same being mounted for rotation upon a stud-shaft 46 and fixed to a novel clutch-wheel 47, which has teeth or burrs of minute pitch, say .03 of an inch.

It is usual in the Underwood typewriter to connect the drive-pinion 42 by means of a pawl and ratchet (not shown) with the pinion-shaft, thereby permitting return movement of the carriage without lifting rack 41 out of the pinion.

For the novel escapement-wheel 47 there is provided a feeding and restraining clutch-dog 49, which is pivoted at 50 upon an arm 51 of a regulatable vibrator 52, which is pivoted concentrically with the escapement-wheel 47 upon stud or arbor 46. The device 51, 52 is a throw-measuring member or a variable-throw arm. In its path is a fixed stop 53 for arresting the paper-carriage. Upon the final stage of the carriage-feeding operation (hereinafter described) having been reached, the parts resume the normal positions at Figure 9.

When depressing any type-key, the universal escapement-bar 36 is moved back by the type-bar shoulder 35, thus imparting movement to frame 54, arms 55, and links 56 pivoted upon the known pivots 57. The links 56 are formed upon a cross-shaft 59, hinged upon opposite pivot-screws 57 adjustably set into vertical frame 61.

Upon one of these links 56 is fastened a rearwardly-extending arm 58, Figure 10. Said arm 58 by means of a short link 62 depresses an arm 63 of an escapement-rocker 64 having a detent dog or clutch 65 pivoted concentrically with rocker 64. These parts are pivoted upon a stud 66 secured by a screw 68 to a boss 69 on an upstanding fixed bracket 70, which may be attached by screws 71 to the rear wall 72 of the main frame of the typewriter.

During the depression of the type-key, the rocker 64 swings its detent-dog 65 from normal Figure 9 position into mesh with the teeth of escapement-wheel 47, as at Figure 11. At this point (Figure 11), it will be seen that both dogs 49, 65 mesh with the escapement-wheel.

Upon leaving the normal position at Figure 9, the first stage is reached at Figure 11, in which the detent-dog 65 is shown swung about its pivot 66 into mesh with the teeth of escapement-wheel 47. At this moment said wheel 47 may be under the restraint of either the regulatable dog 49, or the detent-dog 65. However, as the type-key is finishing its printing stroke, the universal escapement-bar 36 continues to move back, and the rocker 64 is swung further down until a releasing horn 75 thereon engages a pin 76 of said regulatable dog 49, to disengage the latter from wheel 47. At this moment a spring 77 snaps the released vibrator 52 from its normal position at Figure 11, through a regulated stroke to the Figure 12 full-line position, while the detent-dog 65 remains in engagement with the escapement-wheel to restrain it. This stroke is measured by the arrest of the vibrator 52. An intercepting stop 78 is normally in position to arrest said vibrator 52.

So long as any of the keys for the small letters c, e, o, r, s, v, or any of the numerals 1, 2, 3, 4, 5, 6, 7, 8, 9, 0, or a period semicolon or comma, is operated, said stop 78 will not be disturbed. The paper-carriage will accordingly feed equal distances for all of said letters. This distance may be equal to about .085 of an inch, for pica size type, or when the parts are made of the sizes depicted.

Therefore, the escapement of the paper-carriage is controlled by the movement of the single universal bar 36, but the length of movement of the carriage may be regulated by the normally positioned stop 78. This stop is left in normal position so that it may serve to arrest the carriage for a majority of the type-impressions.

When therefore any key is depressed which belongs in this first group, its type-bar strikes the platen, and also presses back the universal bar-frame 36, 54, together with the hinged frame 56, 59, and by means of the link 62 pulls the rocker 64 down and throws its detent-dog 65 into mesh with the escapement-wheel 47, Figure 11, and holds the dog there against the tension of returning spring 129, while the rocker 64 finishes its movement, so that its releasing horn 75 may engage the pin 76 to throw out the regulating dog 49. This permits the spring 77 to snap the vibrator 52 down clockwise at Figure 11, until it is arrested by the normal stop 78. During this stroke of 52, the detent-dog 65 is still effective to restrain the escapement-wheel, Figure 13.

The foregoing operation takes place during the concluding portion of the down stroke of the key, and the carriage remains stationary at this time, so that the paper may receive the printing stroke of the type.

Then the operator lifts his finger from the key, and the universal bar-frame 36, 54 starts forwardly under the tension of returning spring 131; and by means of the hinged frame 56, 59 and the link 62 lifts the rocker 64 and withdraws the detent-dog 65, and then the released escapement-wheel 47 is carried around to the left at Figure 9 by the power of the carriage-propelling spring acting through the rack 41, pinion 42, gear 44 and pinion 45. During the rotation of this escapement-wheel, the regulating dog 49 is carried around by the wheel, with which it is held in mesh by the spring 89 on the vibrator. This movement of the carriage and gear-train and vibrator 52 continues until 52 is arrested in normal position by the stop 53. The regulating dog 49 remains in mesh with the escapement-wheel 47, being held there by spring 89 until the next type-key is operated; so that the carriage-spring is constantly pressing the vibrator 52 against the stop 53, while the machine is waiting the next key-operation; and the detent-dog 65 remains out of mesh with the escapement-wheel 47, the parts now having resumed the normal positions at Figure 9.

It will be perceived that the peripheral speed of the escapement-wheel 47 may be say seven or eight times as great as the travel of the paper-carriage, and that the teeth on the escapement-wheel are very fine; and hence that the spacing of the type-impressions on the sheet may be rendered very exact by the use of fine teeth upon the exaggerated-stroke escapement-wheel. Any error that might occur in the spacing of the letters, would be too minute to be perceptible, and would therefore be negligible. The mechanism serves the further purpose of being suited to the spacing of type-characters which are not multiples of one another, and therefore may conform with the requirements of types of the most approved designs and individual proportions.

Owing to the use of the movement-multiplying gear-train between the carriage-rack and the escapement-wheel, the dogs may move out of mesh with the escapement-wheel with negligible friction, so that the key-operation is very light. The gear and the escapement-wheel may be of very light construction, and therefore will not appreciably retard the movements of the carriage.

In order to regulate the letter-spacing for the letters t, f, l, i, j, there is no need to disturb said regulating stop 78; but an intercepting stop, which is designated as 80, may be swung into place to regulate the stroke of vibrator 52. The stroke from the stop 53 is thereby shortened (see Figure 15) as compared with the Figure 14 stroke. Hence, at the return of any type-key in this second group to normal position, the escapement-movement of the wheel 47 will be proportionally shortened, and the feeding-movement of the carriage will be accordingly reduced. The letters in this group are all thinner than those in the first group; and the extent of carriage-feeding movement may therefore be .065 of an inch.

To bring this intercepting regulator 80 into use by any of the type-keys t, f, l, i, j in this group, the key-lever 21 for each of said five keys has thereon a stud or projection 81, which engages an upstanding cam-arm 82 that is fixed upon a transverse horizontal regulator-shaft 83. To one end of this shaft 83 is also fixed an upstanding operating arm 84, which, by means of a rearwardly-extending link 85, is connected to an arm 86 formed below pivot 87 on the intercepting stop 80, whereby, when any of said keys in this group is depressed, the intercepting stop 80 is swung from the full-line position, Figure 1, to the dotted-line position at Figure 6; the same being shown in full lines at Figure 15.

The stop 80 reaches said Figure 15 position when the stud 81 reaches the high point of cam 82 and rides down along a dwell-portion 88 of said cam. Thus the stop 80 is maintained in its effective position while the type-key is releasing the regulating dog 49 from the escapement-wheel 47, and while said dog is being carried by its vibrator 51 and spring 77 around to strike the top of stop 80, as indicated in dot-and-dash lines at Figure 12.

The pin 76 is still on the dwell 88, while the type starts back from the platen, as the key starts to rise. At this time the horn 75 allows spring 89 to re-engage the dog 49 with the escapement-wheel 47, as at Figure 13. Therefore, as the carriage proceeds, the wheel is driven around, and the dog 49 and vibrator 51, 52 are carried around with the wheel until arrested in normal position by the stop 53, Figure 9.

During the up stroke of any key in this second group, the stud 81 travels up the edge of cam 82, and permits the cam and its rock-shaft 83, link 85 and stop 80 to be returned to normal Figure 1 position by spring 90, Figures 1, 2 and 6. Thus at every stroke of each key t, f, l, i, j, the stop 80 is swung into and out of effective position; but the stop 78 is left undisturbed, in position for use with any of the keys in the first group c, o, e, s, r, v, 1 to 0, period, semicolon or comma.

Nearly every one of the remaining lower-case letters, namely, a, b, d, g, h, k, n, p, q, u, x, y, z, /, -, requires wider spacing. This may be effected by any of the keys in this group, by the use of the same regulating-train parts 83, 85, 86. Upon each of the keys in this group may be placed a stud 91, to engage an upstanding cam 92 fixed upon the same rock-shaft 83, but these particular cams have more inclination, so that each of these third-group keys may rock the shaft 83 to a greater extent than the keys of the second group, and thereby through the link 85 give a greater swing to the arm 86, so as to carry the stop 80 entirely past its effective Figure 15 position to an idle Figure 16 position (shown also in full lines at Figure 6), this being done for the purpose of shifting into use a stop-shoulder 93. Said shoulder is formed upon an element 94 with 80 and 86; but the distance from pivot 87 to 93 is much less than to 80, so that the stop 93 is shorter than 80. It is much shorter than the normal stop 78, as seen at Figure 6, so as to afford a longer throw of the regulator 52.

It will be understood that stop-element 94 swings back against a pin 95, provided upon stop-arm 78, and shifts the latter rearwardly out of normal effective position, so that the regulator 52 may vibrate down past 78 and be arrested by 93.

While any of the keys in this third group is around the bottom portion of its printing stroke, the pin or stud 81 runs on a dwell 96 and holds the stop-shoulder 93 in effective position as at Figure 6, while operations proceed which are shown at Figures 11, 12 and 13; so that the regulator-arm 52 will land on said shoulder 93, Figure 16. Upon relief of the key from pressure, and the return of the universal bar 36 to normal position by the usual spring 131, the detent-dog 65 is withdrawn by the rocker 64, and the dog 49 is moved into wheel-engagement by the spring 89, and the carriage drives the escapement-wheel 47 to the required extent. Said relief of the key from pressure also permits spring 23 to lift the pin 81 from the cam 92, permitting spring 90 to restore the stop-element 94 to the normal Figure 1 position. Spring 98 restores the stop 78 to normal effective position.

Since a capital type is usually wider than a corresponding lower-case type, the feed of the carriage is automatically increased accordingly. The above-described stops for the spacing of lower-case letters are automatically cast off, and a capital-letter stop is brought into use, by novel means connected to the case-shift mechanism of the Underwood machine.

In the drawings, the principal capital-letter stop is designated as 100, Figures 3 and 20. At Figure 3, the case-shift key 101 is shown depressed to cause its lever 102 to elevate the shift-rail frame 103, thereby lifting the platen-frame 30 to upper-case position. A novel link 104, connected to the shift-rail frame, and having a stud 105, engages thereby an arm 106, to lift it, said arm 106 projecting forwardly from an element 107 that carries said stop 100. Hence at the case-shifting operation the stop 100 is brought into use, Figure 20.

By the lifting of arm 106, the stop 100 is moved back to position for arresting the regulator 52, Figures 3 and 20, thereby permitting the carriage to feed a distance suitable for nearly every one of the capital letters, namely, .15 of an inch.

Said arm 107 presses against the pin 95, Figure 3, and throws the normal stop-element 78 out of the path of the regulator 52. The lower-case regulatory rock-shaft 83 and its appurtenances are automatically disabled by the same link 104. This link is pivoted at 87 to the stop-arm 86, 94, the latter being pivoted at this point to an idle arm 108, which may be loosely mounted upon an arbor 109 which carries the various stop-elements.

This arm 108 supports the stop-element 86, 94, while the link 104 pulls stop-element 86, 94 back against an adjustable fulcrum 110. The effect is to cause 86 to drive the link 85 forwardly and vibrate the arm 84 to carry the rock-shaft 83 clockwise at Figure 3, and thereby shift the cam-arms 82, 92 out of reach of the forward key-lever studs 81 and 91, so that when the platen-frame 30 is shifted upwardly the associated keys are not operative to adjust the stops 80, 93 to effective position.

From the foregoing it will be seen that the mere operation of the case-shift mechanism suffices to disable the lower-case space-regulating devices, and to bring into use the capital stop 100, which regulates the spacing for most of the capital letters; and that these parts return to normal positions with the return of the case-shift mechanism.

For spacing the widest capital letters, M and W, there may be provided upon each of their key-levers a stud 112. In the path thereof is a cam 113, whereby is vibrated a bail pivoted upon a shaft 113ª, and consisting of cam-arm 114, transverse member 115 and operating arm 116, the latter being connected by a link 117 to an arm 118 that is provided upon the stop-element 100, to swing the latter out of use and at the same time bring into use a stop-shoulder 119, as at Figure 19, which affords the regulating vibrator 52 a maximum throw.

It will be perceived that the motion of the case-shift-frame, acting through the link 104, is insufficient to swing the stop-shoulder 119 into effective position. That is, said link will swing the member 107 only far enough to carry the stop 100 into effective position. But the stud 112 on either key M or W will complete the throw of the bail 114, 115, 116, to bring the stop 119 into effective position, as at Figure 19.

No further provision needs to be made for the lower-case letters m and w, which may have the same width as the capital letters. When the case-shift train is in normal lower-case position, and the M, W, bail 114, 115, 116 is in normal position, as well as the linkage 117, 118, the keys m and w can still operate quite independently of the case-sift mechanism, so that either stud 112 will shift the bail sufficiently to swing the arm 118 by means of the link 117 to carry stop 119 into effective position, as at Figure 19, so that lower-case m, w may be typed and suitably spaced.

A spring 120 will return to normal position the stop-member 100, 119.

In some cases the types M and W may be formed of the same width as the remaining principal capital letters.

For the thin capital letters I and J and the upper-case characters " and the colon, less extent of letter-spacing is required, and accordingly upstanding cam-arms 121 are fixed upon shaft 113ª, Figures 1 and 8, to be operated by studs 122 upon these key-levers. By means of arm 124 and link 125, an arm 126 is swung forwardly carrying a stop 127 back into use, that is, into the path of the element 52, as at Figures 8 and 18, this interception shortening the range of movement of the member 52, so that the carriage feeds correspondingly less. This stop 127 stands higher than the stop 100 which is normally effective for case-shift position, so that the latter may remain in normal position. Upon relief of the key from pressure the parts are returned by a spring 128.

The I and J keys as can be seen in Figure 5, are each provided with a pin 122 and also the pins 81. It should be remembered that, when these keys are operated in case-shifted position, the pins 81 are idle, not being effective to bring the long stop-element 80 into use.

The quotation-mark is on the same key with the lower-case character figure 2. When printing this lower-case character, the stop 127 may vibrate idly while the normally effective stop 100 stays in position to arrest the vibrator 52.

The stop 127 is also effective to arrest the vibrator 52 when printing the colon-mark.

It will be seen that the carriage is fed by cooperating flexible dogs.

The detent-dog has a rocking arm 64, and a toothed element 65 is articulated to said arm at 66. When the arm 64 is swung, the toothed element 65 is presented to the wheel, but is yieldable against the tension of its spring 129, so that the arm 64 cannot be arrested by the wheel. The spring 129 renders the toothed element 65 self-seating in the wheel-notches.

The arm 51 and the toothed element 49, articulated thereto at 50, form a flexible feeding dog, which is normally pressed back by the wheel 47 as far as permitted by the stop 53; but when the flexible pawl 49, 51 is released by any key, it is snapped around by the spring 77 as far as permitted by the effective stop-arm, and represented to the wheel at the release of the type-key. At this re-presentation, the toothed element 49 yields upon the pivot 50, against the tension of spring 89, so that the parts 64, 63 and the universal bar and key mechanism may complete their own movements. Flexible dog 64, 65 releases the wheel, which drives the dog 51, 49 around to normal Figure 9 position. Both toothed elements 65 and 49 are self-fitting to the wheel-teeth.

As will be perceived by reference to Figure 12, the clearance or spacing between the type-impressions may be uniformly increased, by adjusting the normal stop 53, which for this purpose is made in the form of a projection from a horizontal transverse screw 132, which is mounted in a forked fixture 133; the fork accommodating a nut 134 which may be rotated, to adjust the stop 53 to either left or right. If it is adjusted to the right, it will minimize the clear space between the letters, or even eliminate said space entirely, so that the type-impressions touch one another. Or it may be adjusted to the left to increase the spacing between the letters. It will be understood that this extra spacing will be in addition to the individual space that is required by the letter itself. In other words, the increase is uniform for all the letters, regardless of the space occupied by each type-impression, whether a thin letter or a wide letter.

The device is also useful for special work, as, for instance, when typing a line of dashes, or periods, or under-scoring marks, an additional spacing may be produced after every impression. The extent of adjustment of the stop 53 is not limited to the showing at said Figure 12, as it may be considerably increased.

This device will also prove to be of service in justifying or filling out the line of typing. When the end of a line is being approached, the operator may first count the number of remaining letters required for filling out the line; and if the remaining word is thought to be too short to complete the line, he may adjust the screw 132 to give a little extra spacing for each letter, enough to fill out the line. Or if the operator fears that the last word is going to overrun the line, he may adjust the screw 132 in the opposite direction, and produce the effect of squeezing the type-impressions together, so that the word or words will just fill out the line.

Moreover, the operator may adopt a permanent adjustment for the screw 132, at such a point as gives him the clearance that suits his taste, between all the letters, for regular writing.

For headings, and also for important paragraphs, the stop 53 may be adjusted a little to the left, Figure 12, so as to increase the spacing; and the device is also adapted for other uses.

It will be observed that the use of printers' type calls for the variable unmeasured letter-feeding movements of the carriage to be consonant respectively with the widths of the types which are dissonant widths. For use with said irregularly-variable width types, applicant has an automatically-feed-varying carriage-escapement-mechanism. That is, the feed varies automatically from letter to letter consonantly with the width of the type being printed, so that the result will have the same compactness as a word or line of types printed on an ordinary press.

This automatically-varying escapement-mechanism includes a movement-multiplying train having an escapement-wheel of minute teeth, but the respective widths of the letters need not be multiples of the pitch of the teeth. This train is connected to said carriage. The pitch of the escapement-teeth is less than the escapement-spacing for any type. The spacing dog does not need to land precisely in the notches of the wheel. The dog may slightly overthrow or underthrow; and so the feeding movement of the carriage may be a trifle over-length or a trifle under-length, without being perceptible upon the printed page. Hence, the escapement-wheel is for practically universal use, or substantially the same as if it had a smooth periphery, and as if the dogs were friction dogs. The carriage-feeding detent-dogs are controlled by the universal bars, for automatically securing substantially the proper letter-spacing for the different widths of characters or types.

In addition to all these conditions which are found in this machine, it still has a capacity for minutely and uniformly regulating the throw of the feeding-dog for all the types. Quite regardless of the width or leanness of any type, the feed of the carriage therefore may be regulated. The extent of the increase or diminution will be the same for all types, whether wide or narrow.

The screw-shank is flattened as at 132ª, Figures 3 and 10, and the hole in the bracket or fork 133 is made correspondingly flat, so as to key the screw 132 so that it cannot rotate.

At the front of the keyboard a space-key 135 may be supported upon lever-arms 136 extending forwardly from a rock-shaft 137 to which they are fixed, said shaft carrying a rearwardly-extending lever-arm 138, which operates an arm 139. The latter is pendent from the hinged frame 56, 59 to which it is fixed. Hence said space-key 135 may operate the universal bar-frame 36, 54, and cause the typewriter-carriage to space in a manner already explained. The extent of feed is regulated by a special stop 140, Figures 2 and 17.

This stop-element is mounted upon arbor 109, and has a downwardly-extending arm 141, which is connected by link 142 to arm 143 that rises from the space-key rock-shaft 137; whereby said link is drawn forwardly by the operation of the key and swings the regulating stop 140 into position overtopping normal stop 78, so as to intercept the descending feed-dog vibrating arm 52, as at Figure 17.

This will afford a word-spacing about equal to that of ordinary printing. The key is returned by spring 144. As shown at Figure 1, there is lost motion between the arm 138 and the arm 139, so that the space-key 135 may make the initial portion of its descent idly, while the link 142 is setting the regulator stop-element 140, 141.

A yielding connection in the form of a spring 145 permits the stop 140, 141 to remain stationary after being moved to stopping position, and while further depression of the space-key 135 operates the universal bar 36, 54, to effect the spacing operation. To limit the motion of the stop-arm 140, 141, there may be provided upon it a pin 141ª to engage the frame, see Figure 18.

Upon return of the parts to normal position, said regulator-stop-element may finally be returned by the spring 145. The regulating arm 140 may be made higher, if it is desired that this universal spacer should make a substantially smaller word-space than is made by 78.

There may also be a second space-key bar 146, overlying the front rail 147 of the general typewriter-framework, and mounted upon arms 148 extending forwardly from a rock-shaft 149. Secured to said rock-shaft is an arm 150, extending rearwardly to operate arm 139 of the universal bar-mechanism.

While the typewriting machine is in lower-case position, as at Figure 1, depression of the key-bar 146 will leave the space-regulator stop 78 in normal position, thus giving a full spacing between the words. However, if said key-bar 146 is depressed when the machine is in the capital-shift position seen at Figure 3, the feed-dog arm or space-regulator 52 will be arrested by the stop 100, which is always in position when the platen-frame is in its upper shifted position. Thus the spacing between words when writing capital letters will be automatically increased, even though the same space-key 146 is operated, so that words written with capital letters will be widely spaced without special attention from the operator.

If, when the platen-frame is shifted up, the operator should desire only a moderate spacing between words, he needs only to depress the key 135, which will bring into use the stop 140, Figure 17, just the same when the platen-frame is shifted up as when it is down in normal position. Thus the operator can use 135 for moderate word-spacing, whether typing lower-case letters or capital letters, or he may use 146 all the time, thereby automatically secured moderate spacing for lower-case words and substantially greater spacing for words written in capital letters. Moreover, when typing capital letters, he has the option of securing either the wide spacing or the moderate spacing between words, as may be required in different classes of work.

Variations may be resorted to within the scope of the invention, and portions of the improvements may be used without others.

Having thus described my invention, I claim:

1. The combination with a set of types of varying widths, keys therefor, and a power-driven typewriter-carriage having a rack, of a movement-multiplying train including a small pinion meshing with the rack and connected to drive a large gear, and a small pinion in mesh with said gear, an escapement-wheel of great diameter driven by the second pinion and having teeth of too fine pitch to be capable of use selectively, a feed-dog normally in mesh with said escapement-wheel, a detent-dog, and means operable by the type-keys for feeding the carriage variably by means of said dogs.

2. The combination with a set of types of varying widths, keys therefor, and a power-driven typewriter-carriage having a rack, of a movement-multiplying train including a small pinion meshing with the rack and connected to drive a large gear, and a small pinion in mesh with said gear, an escapement-wheel of great diameter driven by the second pinion and having teeth of pitch of such extreme fineness as to be beyond the range of selectivity, a feed-dog normally in mesh with said escapement-wheel, a detent-dog, a universal bar operable by all the type-keys and connected to release the feed-dog and engage said detent-dog with the wheel at the down stroke of a key, and to withdraw said detent-dog and re-engage said feed-dog at the up stroke of the key, a stop normally limiting the feeding movement of said feed-dog for a certain portion of said keys, and means variably operable by the remainder of the keys for limiting the throw of said feed-dog according to the width of the type printed by the key.

3. The combination with a set of types of varying widths, keys therefor, and a power-driven typewriter-carriage having a rack, of a movement-multiplying train including a small pinion meshing with the rack and connected to drive a large gear, and a small pinion in mesh with said gear, an escapement-wheel of great diameter driven by the second pinion and having teeth of such very fine pitch as to be below the range of selectivity, a feed-dog normally in mesh with said escapement-wheel, a detent-dog, a universal bar operable by all the type-keys and connected to release the feed-dog and engage said detent-dog with the wheel at the down stroke of a key, and to withdraw said detent-dog and re-engage said feed-dog at the up stroke of the key, means variably operable by the keys for limiting the throw of said feed-dog according to the width of the type printed by the key, said feed-dog being mounted upon a variable-throw arm, a spring to operate said arm, the variable-throw arm being restored to normal position by said feed-dog and wheel, and a permanent stop limiting the return stroke of said feed-dog arm.

4. The combination with a typewriter-carriage and a system of typewriter types having printer's-type faces of assorted widths, and keys for said types, of an escapement-wheel provided with teeth of such minute pitch as to be below the range of selective use, a movement-multiplying train of gearing connecting said carriage to said escapement-wheel, and means variably controlled by said keys for co-operating with said teeth to limit the feeding movement of the carriage according to the width of the letter typed, the extent of feeding movement of the escapement-wheel teeth being so many times in excess of the corresponding travel of the carriage, that a one-tooth overthrow or underthrow of the escapement-wheel, due to slippage, has only a negligible effect upon the travel of the carriage.

5. In a variable letter-feeding typewriting machine, the combination with types, keys, and a carriage, of an escapement-wheel having teeth of such minute pitch as to be below the range of selective use, a train of movement-multiplying gearing connecting said carriage to said escapement-wheel, a feed-dog normally meshing with the escapement-wheel, a variable-throw arm whereon said dog is mounted, a detent-dog, means for engaging the detent-dog and releasing the feed-dog with its arm, a spring for vibrating the released arm and feed-dog, a permanent stop arresting said arm and holding the carriage, an assortment of stops for variably arresting the released arm, and means enabling the keys to select appropriate stops.

6. In a variable letter-feeding typewriting machine, the combination with types, keys, and a carriage, of an escapement-wheel having teeth of such minute pitch as to be below the range of selective use, a train of movement-multiplying gearing connecting said carriage to said escapement-wheel, a feed-dog normally meshing with the escapement-wheel, a variable-throw arm whereon said dog is mounted, a detent-dog, means for engaging the detent-dog and releasing the feed-dog with its arm, a spring for vibrating the released arm and feed-dog, a permanent stop arresting said arm and holding the carriage, an assortment of stops for variably arresting the released arm, and means enabling the keys to select appropriate stops, said stops forming a group pivoted side by side and independently operable into and out of the path of said variable-throw arm, thereby determining the extent of the feeding of the carriage at the release of the operated type-key.

7. In a variable letter-feeding typewriting machine, the combination with types, keys, and a carriage, of an escapement-wheel having teeth of such minute pitch as to be below the range of selective use, a train of movement-multiplying gearing connecting said carriage to said escapement-wheel, a feed-dog normally meshing with the escapement-wheel, a variable-throw arm whereon said dog is mounted, a detent-dog, means for engaging the detent-dog and releasing the feed-dog with its arm, a spring for vibrating the released arm and feed-dog, a permanent stop arresting said arm and holding the carriage, an assortment of stops for variably arresting the released arm, and means enabling the keys to select appropriate stops, said stops forming a group pivoted side by side and independently operable into and out of the path of said variable-throw arm, thereby determining the extent of the feeding of the carriage at the release of the operated type-key, said group of stops including one which is normally in position for co-operation with certain frequently used types forming a group; the remaining type-keys having means for selectively bringing others of said stops independently into effective positions.

8. In a variable letter-feeding typewriting machine, the combination with types, keys, and a carriage, of an escapement-wheel having teeth of such minute pitch as to be below the range of selective use, a train of movement-multiplying gearing connecting said carriage to said escapement-wheel, a feed-dog normally meshing with the escapement-wheel, a variable-throw arm whereon said dog is mounted, a detent-dog, means for engaging the detent-dog and releasing the feed-dog with its arm, a spring for vibrating the released arm and feed-dog, a permanent stop arresting said arm and holding the carriage, an assortment of stops for variably arresting the released arm, and means enabling the keys to select appropriate stops, said stops forming a group pivoted side by side and independently operable into and out of the path of said variable-throw arm, thereby determining the extent of the feeding of the carriage at the release of the operated type-key, said group of stops including one which is normally in position for co-operation with certain frequently used types forming a group; the remaining type-keys having means for selectively bringing others of said stops independently into effective positions, said remaining stops including one which is placed to intercept said arm so that it cannot reach said normal stop, whereby the carriage is spaced to a minimum extent for the thinnest types.

9. In a variable letter-feeding typewriting machine, the combination with types, keys, and a carriage, of an escapement-wheel having teeth of minute pitch, a train of movement-multiplying gearing connecting said carriage to said escapement-wheel, a feed-dog normally meshing with the escapement-wheel, a variable-throw arm whereon said dog is mounted, a detent-dog, means for engaging the detent-dog and releasing the feed-dog with its arm, a spring for vibrating the released arm and feed-dog, a permanent stop arresting said arm and holding the carriage, an assortment of stops for variably arresting the released arm, and means enabling the keys to select appropriate stops, said stops forming a group pivoted side by side and independently operable into and out of the path of said variable-throw arm, thereby determining the extent of the feeding of the carriage at the release of the operated type-key, said group of stops including one which is normally in position for co-operation with certain frequently used types forming a group; the remaining type-keys having means for selectively bringing others of said stops independently into effective positions, said remaining stops including one which is placed to intercept said arm so that it cannot reach said normal stop, whereby the carriage is spaced to a minimum extent for the thinnest types, all the remaining stops having selective means for displacing said normally effective stop to afford said variable-throw arm more variably lengthened strokes to correspond with the widths of the types being printed.

10. The combination with a power-driven typewriter-carriage, of a movement-multiplying gear-train driven thereby and having an escapement-wheel with teeth of such minute pitch as to be below the range of selective use, a feeding and restraining dog normally in mesh with said wheel, a detent-dog normally released from said wheel, means operable by the keys for engaging the detent-dog and releasing the feeding dog, a variable-throw arm whereon the feeding dog is pivoted, a spring for operating the variable-throw arm when released, and means selectively operable by the keys for varying the throw of the released arm, the feeding dog being re-engaged and the detent-dog disengaged at the release of the key, whereby the escapement-wheel may be driven by the carriage, and a permanent stop for arresting the variable-throw arm and the carriage.

11. The combination with a power-driven typewriter-carriage, of a movement-multiplying gear-train driven thereby and having an escapement-wheel with teeth of too minute pitch to be within the range of selective use, a feeding and restraining dog normally in mesh with said wheel, a detent-dog normally released from said wheel, means operable by the keys for engaging the detent-dog and releasing the feeding dog, a variable-throw arm whereon the feeding dog is pivoted, a spring for operating the variable-throw arm when released, and means selectively operable by the keys for varying the throw of the released arm, the feeding dog being re-engaged and the detent-dog disengaged at the release of the key, whereby the escapement-wheel may be driven by the carriage, a permanent stop for arresting the variable-throw arm and the carriage, a key-operated rocker whereon said detent-dog is mounted, and means operable by said rocker for disengaging the feeding dog and engaging the detent with the escapement-wheel, said rocker including a horn extending about circumferentially of the wheel, to maintain the disengagement of the released dog while the type-key is held depressed.

12. The combination with a set of types of varying widths, keys therefor, and a power-driven typewriter-carriage having a rack, of a movement-multiplying train including a small pinion meshing with the rack and connected to drive a large gear, and a small pinion in mesh with said gear, an escapement-wheel of great diameter driven by the second pinion and having teeth of very fine pitch, a feed-dog normally in mesh with said escapement-wheel, an arm carrying said feed-dog, a detent-dog, a universal bar operable by all the type-keys and connected to release the feed-dog and engage said detent-dog with the wheel at the down stroke of a key, and to withdraw said detent-dog and re-engage said feed-dog at the up stroke of the key, a stop normally positioned for arresting said feed-dog arm at the release thereof by said keys, an intercepting stop for reducing the throw of said arm, a space-regulator train including a shaft extending transversely of the keys, cam-arms upon said shaft for enabling it to be operated by pins upon the keys for the narrowest types, and means operable by said shaft for bringing into use said intercepting stop, thereby giving the carriage a minimum feeding movement, and means variably operable by the remainder of the keys for limiting the throw of said feed-dog according to the width of the type printed by the key.

13. The combination with a set of types of varying widths, keys therefor, and a power-driven typewriter-carriage having a rack, of a movement-multiplying train including a small pinion meshing with the rack and connected to drive a large gear, and a small pinion in mesh with said gear, an escapement-wheel of great diameter driven by the second pinion and having teeth of very fine pitch, a feed-dog normally in mesh with said escapement-wheel, an arm carrying said feed-dog, a detent-dog, a universal bar operable by all the type-keys and connected to release the feed-dog and engage said detent-dog with the wheel at the down stroke of a key, and to withdraw said detent-dog and re-engage said feed-dog at the up stroke of the key, a stop normally positioned for arresting said feed-dog arm at the release thereof by said keys, an intercepting stop for reducing the throw of said arm, a space-regulator train including a shaft extending transversely of the keys, cam-arms upon said shaft for enabling it to be operated by pins upon the keys for the narrowest types, and means operable by said shaft for bringing into use said intercepting stop, thereby giving the carriage a minimum feeding movement, and means variably operable by the remainder of the keys for limiting the throw of said feed-dog according to the width of the type printed by the key, each cam on said shaft having a dwell-portion to enable its stop to be maintained in effective position while the operated type-key is releasing the feeding or regulating dog from the escapement-wheel, and while said dog and its vibrator are being carried around to strike the stop; the pin being still on the dwell while the type starts back from the platen and the key starts to rise, allowing the re-engagement of the feeding dog with the escapement-wheel.

14. The combination with a set of types of varying widths, keys therefor, and a power-driven typewriter-carriage having a rack, of a movement-multiplying train including a small pinion meshing with the rack and connected to drive a large gear, and a small pinion in mesh with said gear, an escapement-wheel of great diameter driven by the second pinion and having teeth of very fine pitch, a feed-dog normally in mesh with said escapement-wheel, an arm carrying said feed-dog, a detent-dog, a universal bar operable by all the type-keys and connected to release the feed-dog and engage said detent-dog with the wheel at the down stroke of a key, and to withdraw said detent-dog and re-engage said feed-dog at the up stroke of the key, a stop normally positioned for arresting said feed-dog arm at the release thereof by said keys, an intercepting stop for reducing the throw of said arm, a space-regulator train including a shaft extending transversely of the keys, cam-arms upon said shaft for enabling it to be operated by pins upon the keys for the narrowest types, and means operable by said shaft for bringing into use said intercepting stop, thereby giving the carriage a minimum feeding movement, said rock-shaft having other cams fixed thereon for engagement by keys that operate wider types, said other cams having greater inclination so as to bring into use a stop which permits the variable throw of the arm and feeding dog, said stop having means to displace the normally effective stop.

15. The combination with a set of types of varying widths, keys therefor, and a power-driven typewriter-carriage having a rack, of a movement-multiplying train including a small pinion meshing with the rack and connected to drive a large gear, and a small pinion in mesh with said gear, an escapement-wheel of great diameter driven by the second pinion and having teeth of such very fine pitch as to be below the range of selective use, a feed-dog normally in mesh with said escapement-wheel, a detent-dog, a universal bar operable by all the type-keys and connected to release the feed-dog and engage said detent-dog with the wheel at the down stroke of a key, and to withdraw said detent-dog and reengage said feed-dog at the up stroke of the key, means variably operable by the keys for limiting the throw of said feed-dog according to the width of the type printed by the key, said feed-dog being mounted upon a variable-throw arm, a spring to operate said arm, the variable-throw arm being restored to normal position by said feed-dog and wheel, a permanent stop limiting the return stroke of said feed-dog arm, a case-shifting mechanism, and means controlled by said case-shifting mechanism for dominating the regulation of said variable-throw arm and feeding dog.

16. The combination with a set of types of varying widths, keys therefor, and a power-driven typewriter-carriage having a rack, of a movement-multiplying train including a small pinion meshing with the rack and connected to drive a large gear, and a small pinion in mesh with said gear, an escapement-wheel of great diameter driven by the second pinion and having teeth of very fine pitch, a feed-dog normally in mesh with said escapement-wheel, a detent-dog, a universal bar operable by all the type-keys and connected to release the feed-dog and engage said detent-dog with the wheel at the down stroke of a key, and to withdraw said detent-dog and re-engage said feed-dog at the up stroke of the key, means variably operable by the keys for limiting the throw of said feed-dog according to the width of the type printed by the key, said feed-dog being mounted upon a variable-throw arm, a spring to operate said arm, a normally effective stop for limiting the throw of said arm, the variable-throw arm being restored to normal position by said feed-dog and wheel, a permanent stop limiting the return stroke of said feed-dog arm, a case-shifting mechanism, a displacing train controlled by the case-shifting mechanism, and means operable by said train for setting into effective position a stop which permits a uniform throw of the variable-throw arm for all of those capital letters which have substantially uniform width, and for throwing out of use said normally effective stop.

17. The combination with a set of types of varying widths, keys therefor, and a power-driven typewriter-carriage having a rack, of a movement-multiplying train including a small pinion meshing with the rack and connected to drive a large gear, and a small pinion in mesh with said gear, an escapement-wheel of great diameter driven by the second pinion and having teeth of very fine pitch, a feed-dog normally in mesh with said escapement-wheel, an arm carrying said feed-dog, a detent-dog, a universal bar operable by all the type-keys and connected to release the feed-dog and engage said detent-dog with the wheel at the down stroke of a key, and to withdraw said detent-dog and re-engage said feed-dog at the up stroke of the key, a stop normally positioned for arresting said feed-dog arm at the release thereof by said keys, an intercepting stop for reducing the throw of said arm, a space-regulator train including a shaft extending transversely of the keys, cam-arms upon said shaft for enabling it to be operated by pins upon the keys for the narrowest types, and means operable by said shaft for bringing into use said intercepting stop, thereby giving the carriage a minimum feeding movement, means variably operable by the remainder of the keys for limiting the throw of said feed-dog according to the width of the type printed by the key, a case-shifting mechanism, means controlled by said case-shifting mechanism for dominating the regulation of said variable-throw arm and feeding dog, and means also connected to said case-shift mechanism for disabling said regulator train, by shifting cam-arms upon the latter out of reach of the pins upon the affected lower-case keys or key-levers.

18. The combination with a set of types of varying widths, keys therefor, and a power-driven typewriter-carriage having a rack, of a movement-multiplying train including a small pinion meshing with the rack and connected to drive a large gear, and a small pinion in mesh with said gear, an escapement-wheel of great diameter driven by the second pinion and having teeth of very fine pitch, a feed-dog normally in mesh with said escapement-wheel, a detent-dog, a universal bar operable by all the type-keys and connected to release the feed-dog and engage said detent-dog with the wheel at the down stroke of a key, and to withdraw said detent-dog and re-engage said feed-dog at the up stroke of the key, means variably operable by the keys for limiting the throw of said feed-dog according to the width of the type printed by the key, said feed-dog being mounted upon a variable-throw arm, a spring to operate said arm, the variable-throw arm being restored to normal position by said feed-dog and wheel, a permanent stop limiting the return stroke of said feed-dog arm, a case-shifting mechanism, a displacing train controlled by the case-shifting mechanism, and means operable by said train for setting into effective position a stop which permits a uniform throw of the variable-throw arm for all of those capital letters which have substantially uniform width, the key-levers which operate the capital types M and W being provided with studs, a cam operable by said studs, means operable by said cam to move the general capital stop out of effective position, and a special stop moved into effective position by said M and W keys to afford the variable-throw arm a maximum throw; said stop for the capital letters M and W being also operable by the same keys when the machine is set for lower-case, to give the small letters m and w the same spacing as the corresponding capital letters.

19. The combination with a set of types of varying widths, keys therefor, and a power-driven typewriter-carriage having a rack, of a movement-multiplying train including a small pinion meshing with the rack and connected to drive a large gear, and a small pinion in mesh with said gear, an escapement-wheel of great diameter driven by the second pinion and having teeth of very fine pitch, a feed-dog normally in mesh with said escapement-wheel, an arm carrying said dog, a detent-dog, a universal bar operable by all the type-keys and connected to release the feed-dog and engage said detent-dog with the wheel at the down stroke of a key, and to withdraw said detent-dog and re-engage said feed-dog at the up stroke of the key, a stop normally positioned for arresting said feed-dog arm at the release thereof by said keys, an intercepting stop for reducing the throw of said arm, a space-regulator train including a shaft extending transversely of the keys, cam-arms upon said shaft for enabling it to be operated by pins upon the keys for the narrowest types, and means operable by said shaft for bringing into use said intercepting stop, thereby giving the carriage a minimum feeding movement, means variably operable by the remainder of the keys for limiting the throw of said feed-dog according to the width of the type printed by the key, a case-shifting mechanism, means controlled by said case-shifting mechanism for dominating the regulation of said variable-throw arm and feeding dog, means also connected to said case-shift mechanism for disabling said regulator train, and means brought into use for reducing the travel of the carriage for some letters, when the machine is in upper-case position, including upstanding cam-arms upon shaft 113ª to be operated by studs 122 upon the desired key-levers, and a stop 127 brought into use by said studs to intercept the variable-throw element 52 to reduce the feed of the carriage correspondingly, the keys for the thinnest characters being provided each with pins 122 and 81.

20. In a typewriting machine, the combination with printer's-face types and a carriage, of an escapement-mechanism therefor, including a movement-multiplying train having an escapement-wheel of minute teeth, key-controlled feeding and detent dogs for said escapement-wheel, means for minutely and uniformly regulating the throw of the feeding dog for all the types, a stop for the feeding dog, and a screw-device for varying the position of said stop to regulate the stroke of the feeding dog, and thereby effect the spacing uniformly for all the types.

21. A set of printers' types, keys for operating them, a carriage, an escapement-wheel, a feeding dog, carriage-escapement mechanism operable by said keys and co-operative with said escapement-wheel, and including devices each controllable by a group of keys for regulating the throw of the feeding dog, and a finger-piece having means for uniformly regulating the extent of throw of the feeding dog for all the keys.

22. In a typewriting machine, the combination with a set of types of assorted widths, and a carriage, of means for causing the feed of the carriage to correspond with the width of the letter typed, and means for minutely varying the spacing for all letters simultaneously and uniformly.

23. A typewriting machine having a carriage and a set of printer's-face types, keys, means to enable the keys to feed the carriage variably to harmonize with the various widths of the types, and means adjustable for minutely varying the extent of carriage-feed for all the types alike.

24. In a typewriting machine having types of various widths, keys therefor, and a power-driven carriage, the combination of movement-multiplying gearing driven by said carriage, an escapement-wheel driven by said carriage and formed with teeth of minute pitch, flexible dogs controlled by said keys and cooperative with said wheel, each flexible dog having a key-actuated element and a toothed element articulated thereto to yield when presented to the wheel, and springs for restoring said toothed elements; said dogs including a feeding dog; and stops variably controlled by the keys for regulating at different key-strokes the extent to which the feeding dog is variably driven by the wheel; said dogs also including a flexible detent controlled by said keys and self-fitting to the wheel to hold said wheel when it is released from the feeding dog.

25. In a typewriting machine, the combination with printer's-face types and a carriage, of an escapement-mechanism therefor, including a movement-multiplying train having an escapement-wheel of minute teeth, key-controlled feeding and detent dogs for said escapement-wheel, including means to effect variable throw of said feeding dog automatically, for feeding the carriage in proportion to the different widths of the letters typed, and settable means for minutely and uniformly regulating the variable throw of the feeding dog for all the types.

26. In a typewriting machine, the combination with printer's-face types and a carriage, of an escapement-mechanism therefor, including a movement-multiplying train having an escapement-wheel of minute teeth, key-controlled feeding and detent dogs for said escapement-wheel, including means to effect variable throw of said feeding dog automatically, for feeding the carriage in proportion to the different widths of the letters typed, and settable means for minutely and uniformly regulating the variable throw of the feeding dog for all the types, including a stop for the feeding dog, and a screw-device for varying the position of said stop to regulate the stroke of the feeding dog, and thereby alter the spacing uniformly for all the types.

27. In a typewriting machine, the combination with printers' face types of irregulary varying widths, and a power-driven carriage, of a substantially universal escapement-mechanism therefor, including a movement-multiplying train of gearing extending from said carriage and having an escapement-wheel of minute teeth, the pitch of said teeth being substantially less than the corresponding carriage-escapement movement for the thinnest types, and said pitch being so fine, and the angular movement of said escapement-wheel at the carriage-feed being so great, that a discrepancy of one notch in the carriage-spacing movement of said wheel will not be noticeable on the typed work-sheet, key-controlled variable feeding and detent dogs for said escapement-wheel for controlling the feed of the carriage to agree approximately with the widths of the respective types, the extents of the letter-feeding movements of the carriage being unmeasured, and means settable at will for uniformly regulating the throw of the feeding-dog at the key-strokes for all the types regardless of their respective widths, whereby the approximate extent of letter-spacing of the carriage can be uniformly increased or diminished at will for all types.

BURNHAM C. STICKNEY.

CERTIFICATE OF CORRECTION.

Patent No. 2,111,410.                                    March 15, 1938.

BURNHAM C. STICKNEY.

It is hereby certified that error appears in the printed specification of the above numbered patent requiring correction as follows: Page 5, first column, line 61, for "case-sift" read case-shift; page 6, second column, line 71, for "secured" read securing; and that the said Letters Patent should be read with these corrections therein that the same may conform to the record of the case in the Patent Office.

Signed and sealed this 3d day of May, A. D. 1938.

(Seal)

Henry Van Arsdale,
Acting Commissioner of Patents.

26. In a typewriting machine, the combination with printer's-face types and a carriage, of an escapement-mechanism therefor, including a movement-multiplying train having an escapement-wheel of minute teeth, key-controlled feeding and detent dogs for said escapement-wheel, including means to effect variable throw of said feeding dog automatically, for feeding the carriage in proportion to the different widths of the letters typed, and settable means for minutely and uniformly regulating the variable throw of the feeding dog for all the types, including a stop for the feeding dog, and a screw-device for varying the position of said stop to regulate the stroke of the feeding dog, and thereby alter the spacing uniformly for all the types.

27. In a typewriting machine, the combination with printers' face types of irregulary varying widths, and a power-driven carriage, of a substantially universal escapement-mechanism therefor, including a movement-multiplying train of gearing extending from said carriage and having an escapement-wheel of minute teeth, the pitch of said teeth being substantially less than the corresponding carriage-escapement movement for the thinnest types, and said pitch being so fine, and the angular movement of said escapement-wheel at the carriage-feed being so great, that a discrepancy of one notch in the carriage-spacing movement of said wheel will not be noticeable on the typed work-sheet, key-controlled variable feeding and detent dogs for said escapement-wheel for controlling the feed of the carriage to agree approximately with the widths of the respective types, the extents of the letter-feeding movements of the carriage being unmeasured, and means settable at will for uniformly regulating the throw of the feeding-dog at the key-strokes for all the types regardless of their respective widths, whereby the approximate extent of letter-spacing of the carriage can be uniformly increased or diminished at will for all types.

BURNHAM C. STICKNEY.

CERTIFICATE OF CORRECTION.

Patent No. 2,111,410. March 15, 1938.

BURNHAM C. STICKNEY.

It is hereby certified that error appears in the printed specification of the above numbered patent requiring correction as follows: Page 5, first column, line 61, for "case-sift" read case-shift; page 6, second column, line 71, for "secured" read securing; and that the said Letters Patent should be read with these corrections therein that the same may conform to the record of the case in the Patent Office.

Signed and sealed this 3d day of May, A. D. 1938.

(Seal)

Henry Van Arsdale, Acting Commissioner of Patents.

CERTIFICATE OF CORRECTION.

Patent No. 2,111,410.                                                    March 15, 1938.

BURNHAM C. STICKNEY.

It is hereby certified that error appears in the printed specification of the above numbered patent requiring correction as follows: Page 5, first column, line 61, for "case-sift" read case-shift; page 6, second column, line 71, for "secured" read securing; and that the said Letters Patent should be read with these corrections therein that the same may conform to the record of the case in the Patent Office.

Signed and sealed this 3d day of May, A. D. 1938.

(Seal)

Henry Van Arsdale,
Acting Commissioner of Patents.